June 16, 1936.   G. W. LAWRENCE   2,044,754
AUTOMATIC KEYBOARD
Filed Oct. 23, 1931   11 Sheets-Sheet 1

INVENTOR
George W. Lawrence,
BY
Clarence B. Foster
ATTORNEY

June 16, 1936.    G. W. LAWRENCE    2,044,754
AUTOMATIC KEYBOARD
Filed Oct. 23, 1931    11 Sheets-Sheet 2

INVENTOR.
George W. Lawrence,
BY
ATTORNEY

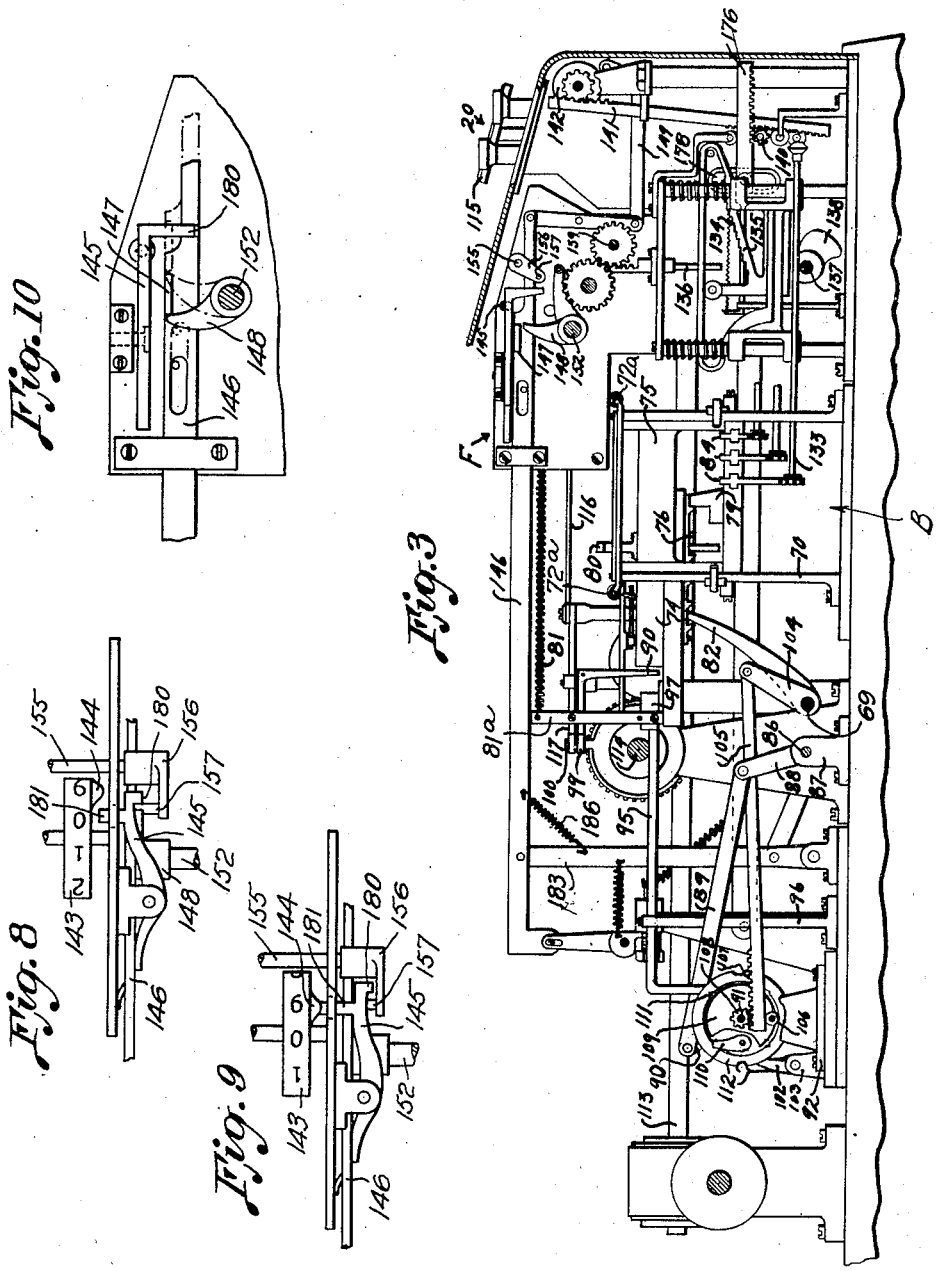

June 16, 1936.　　G. W. LAWRENCE　　2,044,754
AUTOMATIC KEYBOARD
Filed Oct. 23, 1931　　11 Sheets-Sheet 4
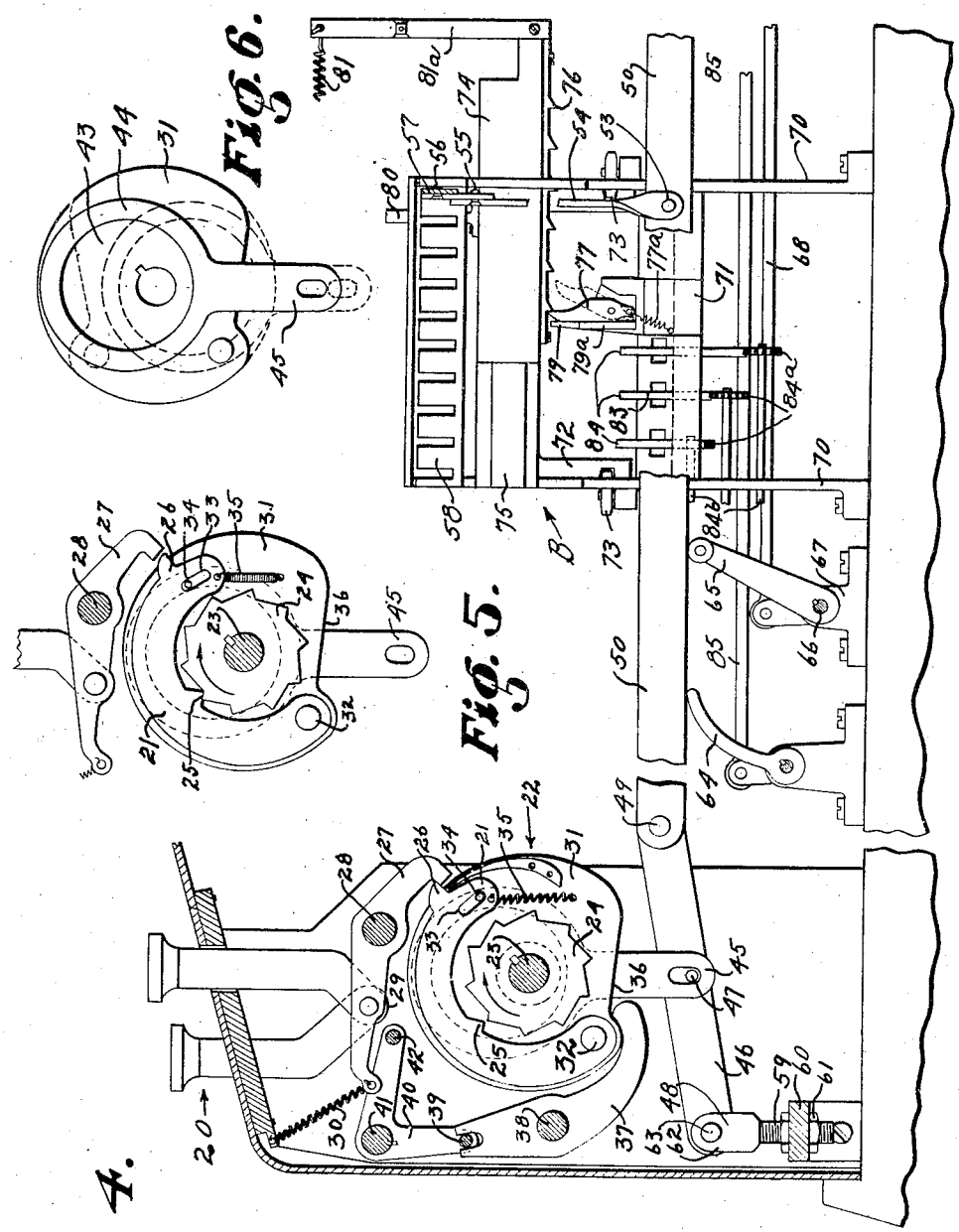
INVENTOR.
George W. Lawrence,
BY Clarence B. Foster
ATTORNEY

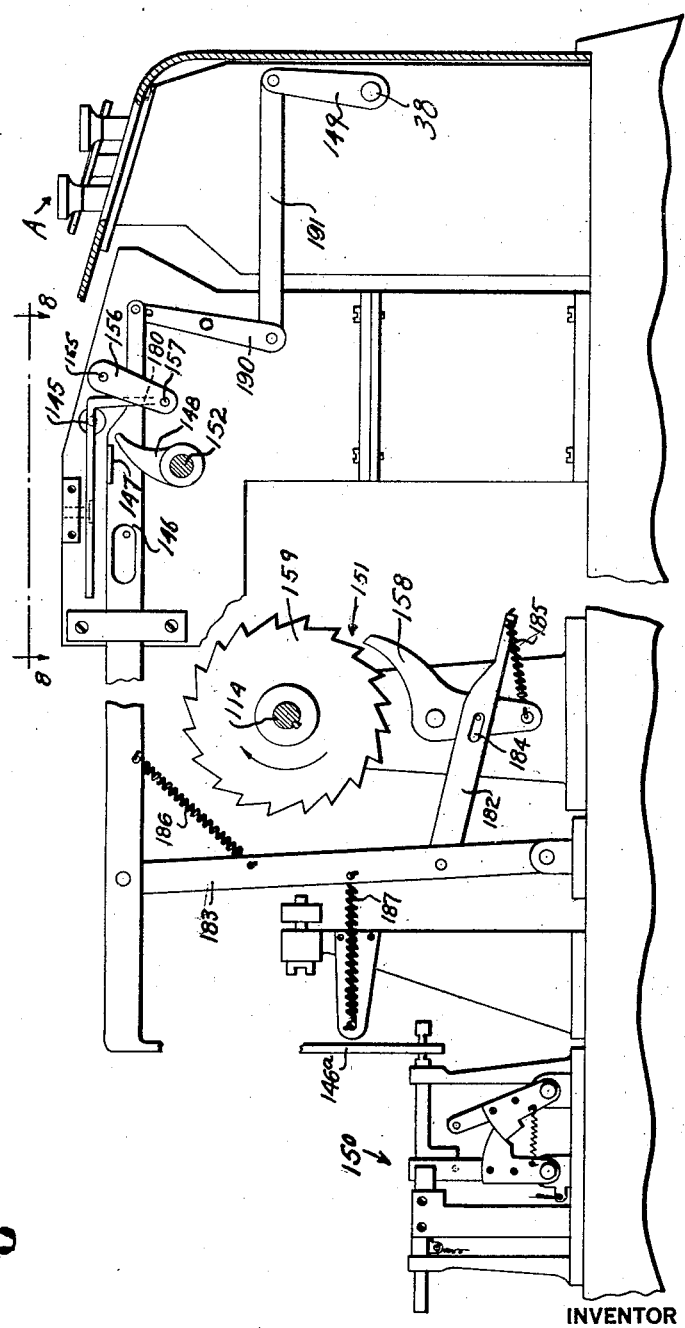

Inventor:
GeorgeW.Lawrence
By
Milburn & Milburn
Attorneys.

June 16, 1936.  G. W. LAWRENCE  2,044,754
AUTOMATIC KEYBOARD
Filed Oct. 23, 1931     11 Sheets-Sheet 7

Inventor
GEORGE W. LAWRENCE
By Milburn & Milburn
Attorneys.

June 16, 1936.   G. W. LAWRENCE   2,044,754
AUTOMATIC KEYBOARD
Filed Oct. 23, 1931   11 Sheets-Sheet 8

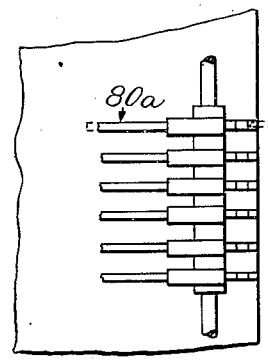
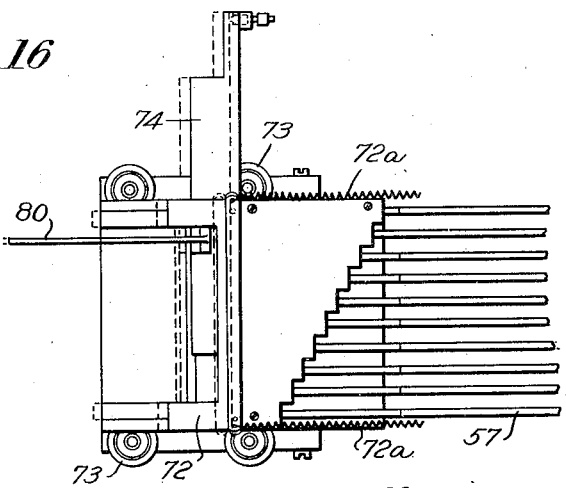
Fig. 16
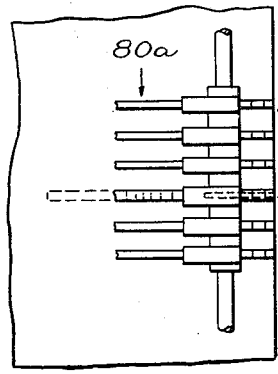
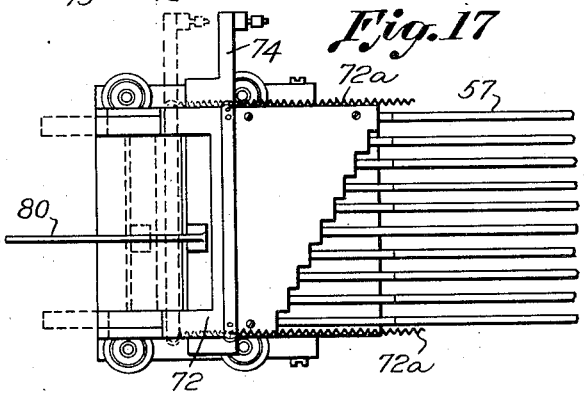
Fig. 17
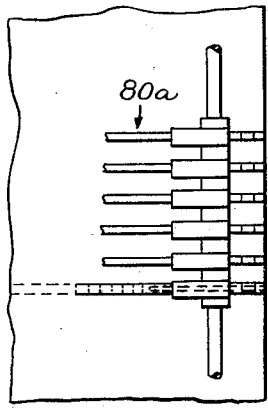
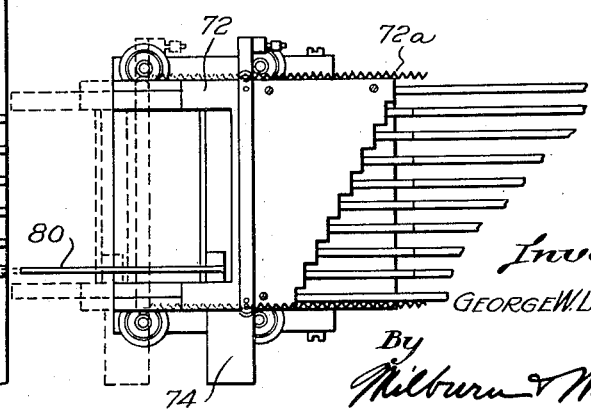
Fig. 18

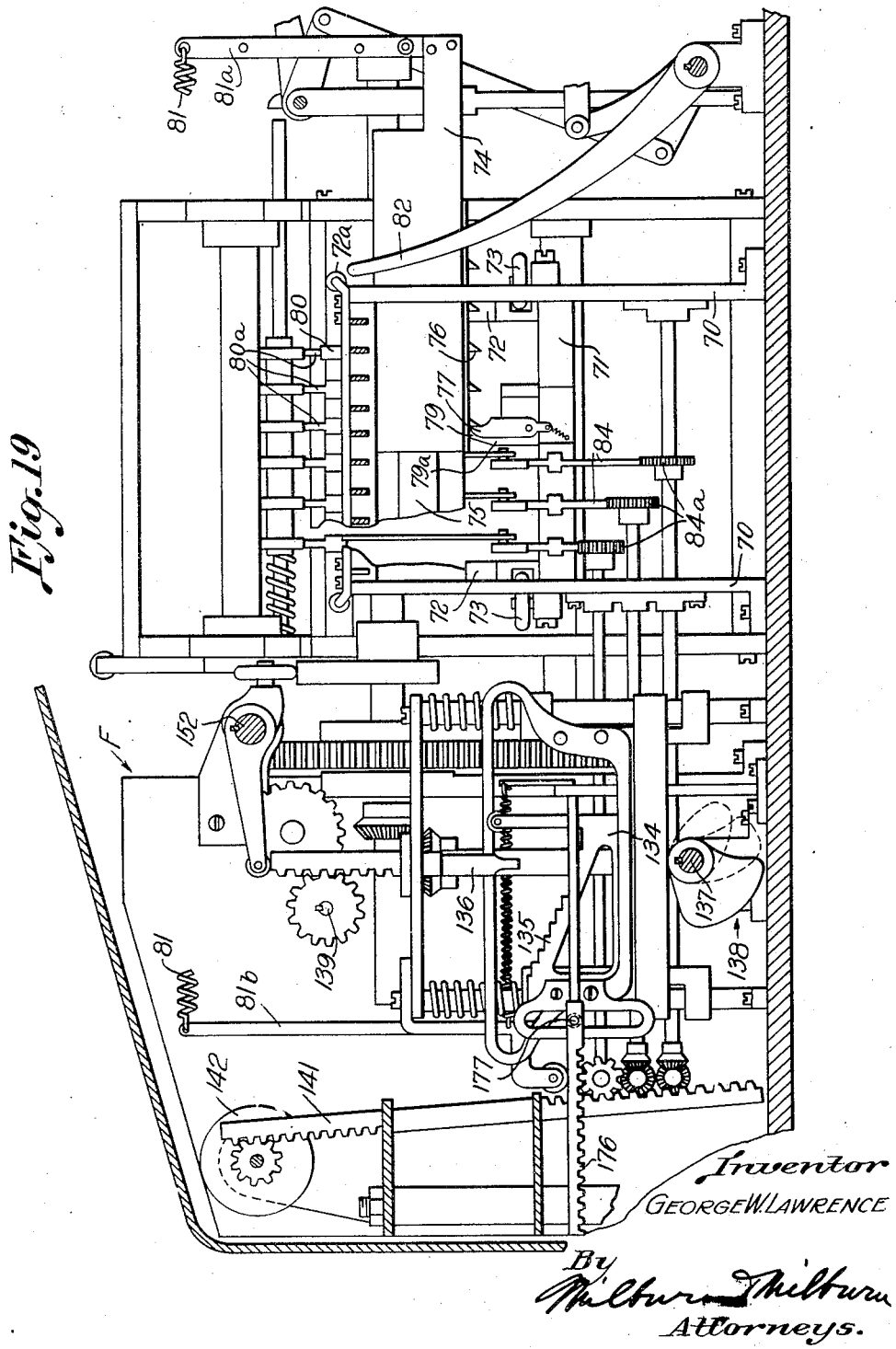

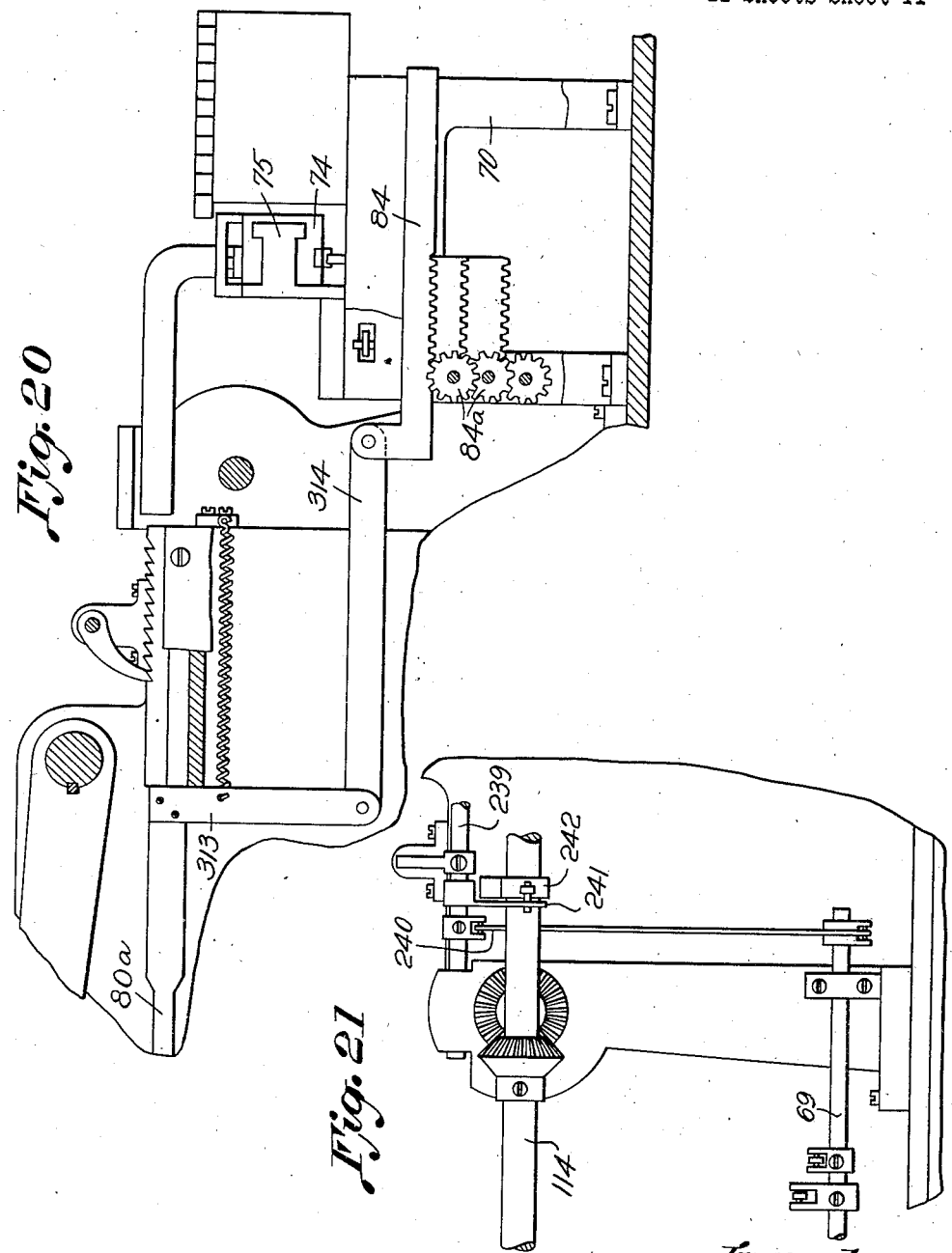

Patented June 16, 1936

2,044,754

UNITED STATES PATENT OFFICE 2,044,754

AUTOMATIC KEYBOARD

George W. Lawrence, Los Angeles, Calif., assignor, by mesne assignments, to Postal Automatic Machines, Inc., a corporation of Delaware Application October 23, 1931, Serial No. 570,622

3 Claims. (Cl. 235—132)

This invention relates to an automatic keyboard designed to be used in conjunction with and to operate a parcel post machine such as disclosed in a co-pending application Serial No. 367,106, filed May 29, 1929, by William J. Pearson and titled Parcel post weighing and stamp printing machine, which machine is designed to weigh parcel post packages and to print parcel post stamps of the prepaid metered type.

An object of my invention is to provide a keyboard of the simplest form and character to provide ease and simplicity of operation for an operator of an otherwise complicated machine, and to provide a mechanism that will respond to a very light touch upon the keys, and to that end I have provided a series of power driven clutches disposed between the keys and the machine actuating elements, and therefore the keys are essentially each a clutch actuating lever whereby the power is connected to the machine operating elements.

An object of my invention is to provide a mechanism whereby a multiple of numbers may be set up in a machine by means of a keyboard comprising only a single bank of ten keys, these numbers being operated successively and in the sequence which they will assume when printed. An extension of the same mechanism also transfers the mechanical equivalents of the same numbers to a register actuating mechanism which is operated to actuate the registers to register the numbers at the time that a printing operation takes place in the machine, and thereupon the machine is cleared of the numerical set-up and cleared for the next operation, with such parts as need to be set for operation re-set in the position necessary for such operation; this arrangement including the selector elements which transmit the movement originating at the keyboard to the numeral printer and the register set-up mechanism by successive positions and contacts, making one movement transversely of the travel of the original movement upon the touching of each key on the keyboard; also a progressive release lock which must be set to an original position that it may be rotated one position for each key touched on the keyboard until the number of keys corresponding to the number of numerals to be printed has been operated, which in the machine disclosed is six, whereupon the locking element adjacent the power clutch is released and the machine may be operated for printing purposes. Should only five or seven keys be operated or any number other than the six required, the lock is not released and the machine must be cleared and the numerals be correctly punched in the machine.

Another object of my invention is to provide a type of clutch connection between the keys and the power driven elements of the clutches whereby instant operation occurs at the touch of a key, and which is simple in construction and durable.

Various other objects and advantages will be more fully apparent from the following description of the accompanying drawings which form a part of this disclosure, and which illustrate a preferred form of embodiment of the invention.

Of the drawings:

Fig. 3 is an elevation from the left of the keyboard and connecting parts operated therefrom taken on line 3—3 of Fig. 1, showing diagrammatically the relation of the various parts.

Fig. 4 is an elevation in section from the right of the keyboard and a portion of the selector as taken on line 4—4 of Fig. 1.

Fig. 5 is a detail of one of the keyboard clutches from the right in unlatched position.

Fig. 6 is a diagrammatic view similar to Fig. 5, showing the operation of the clutch cam.

Fig. 7 is an elevation from the left showing the relation of the keyboard and connected parts of the register controlled lock only in diagrammatic form, similar to Fig. 3.

Fig. 8 is a partial plan view of the tripping mechanism in disengaged position, taken approximately on line 8—8 of Fig. 7.

Fig. 9 is a view similar to that of Fig. 8, showing the tripping mechanism in engaged position, and Fig. 10 is a partial view similar to Fig. 7, showing the tripping mechanism engaged by the power means and illustrating in dotted lines the positions of the parts after their movement as the result of such engagement.

Fig. 16 is a semi-diagrammatic plan view of the selector unit, showing it in original and second position.

Fig. 17 is a similar view of the selector, showing it in an intermediate transverse and a second longitudinal position.

Fig. 18 is a similar view of the selector showing it in final transverse position.

Fig. 19 is an enlarged vertical sectional view of the elevators and selector, taken approximately on line 19—19 of Fig. 1 and showing semi-diagrammatically the means by which movement of the selector arm, transmitted to the rack bars 80a, is also transmitted to the control meter.

Fig. 20 is a detail view of the connection between the numeral printer racks and the register racks.

Fig. 21 is a detail elevational view of the operative connection of the error rock shaft with the main drive shaft of the machine, illustrating the means by which the rock shaft is operated upon completion of an operation cycle of the machine.

Figure 1:
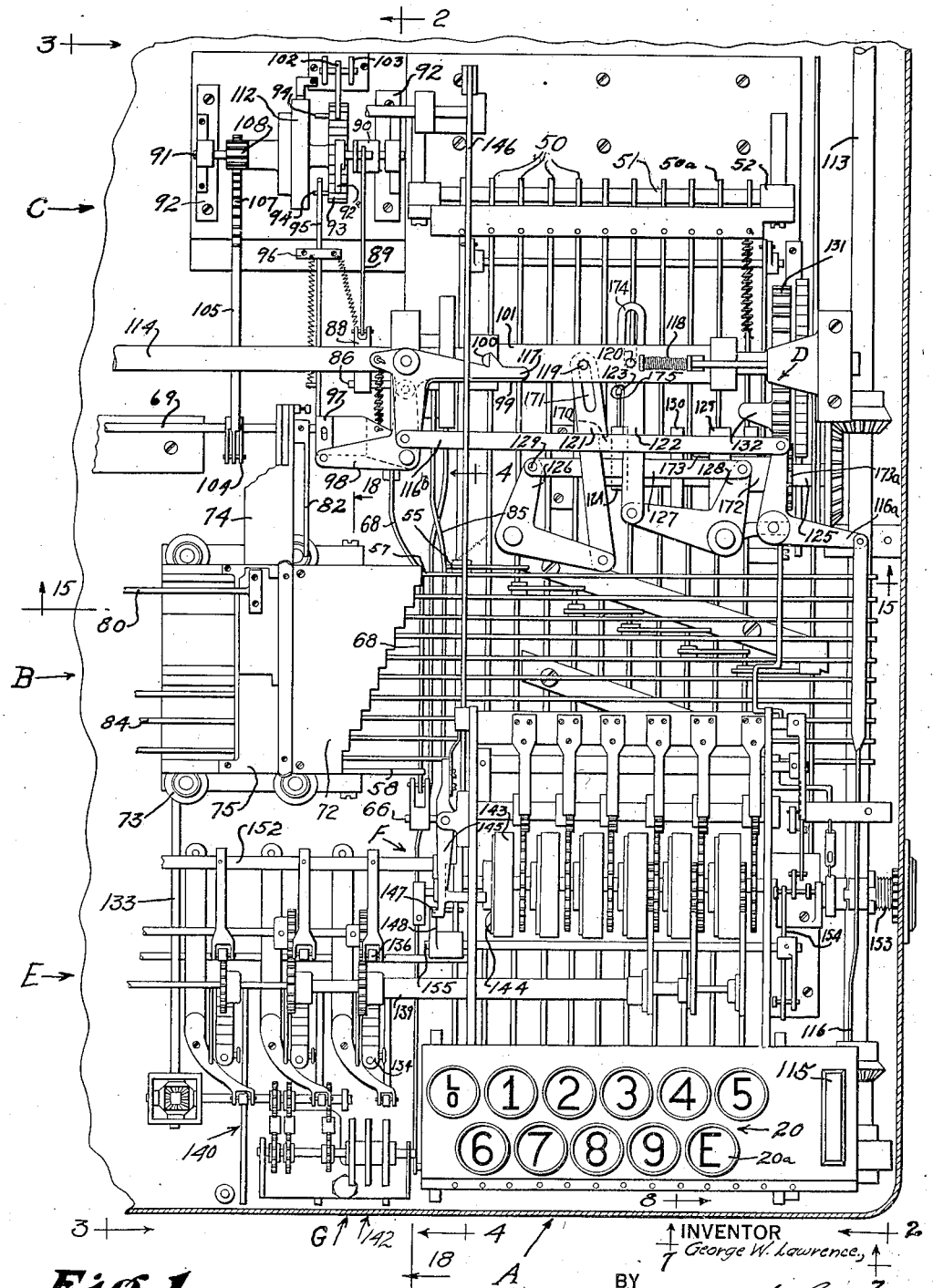
Fig. 1 is a plan view of a portion of a parcel post machine, disclosing an automatic keyboard and the connecting parts operated therefrom.

Referring to Fig. 1, which illustrates a portion of a parcel post machine, namely, that section containing the keyboard and its connected parts, which operate to set up the desired combinations of figures for printing and for registering in the registers, I will designate the individual units by letters, the keyboard proper being A, the selector B, the progressive release lock C, the power clutch D, the register set up mechanism E, the control register F, and the indicator G.

The keyboard unit A comprises a set of keys 20 which operate to release engaging latches 21 in individual clutches 22; these clutches include a drive shaft 23, to which are keyed toothed wheels 24 adapted to engage a corresponding tooth 25 on the latch 21, which latch is provided with a projecting member 26 adapted to be engaged by the rocking arm 27 mounted on shaft 28, and engaged by one of the keys at 29 and tensioned by means of spring 30. The clutch 22 has a rotatable member in the form of a cam 31 which revolves on the shaft 23 and which is provided with a pin 32 forming a fulcrum point for the latch 21, which latch at the other end is provided with a slotted opening 33 in which rides a pin 34, provided for limiting the movement of the latch 21, and which is secured to the cam 31, the latch 21 being tensioned toward an engaged position with the toothed wheel 24 by the spring 35, one end of which is fastened to the cam 31.

The cam face 36 of the cam 31 is contacted by lever 37 secured to the rock shaft 38, the lever 37 having a bifurcated section at its opposite end to engage a pin 39 mounted in one end of a bell crank 40; the bell crank 40 being secured to the rock shaft 41, its other end being provided with a pin 42 for engagement with the rocking arm 27 whereby the rotation of the clutch 22 and the cam 31 will function to return the rocking arm 27 to a position in the path of the projecting member 26 of latch 21, and upon engagement of these two parts, will release the tooth 25 from engagement with the toothed wheel 24, thus releasing the clutch. The rotation of one cam rocks levers 37 and 40 and locks all the keys 20 against depression during a clutch operation.

This form of clutch is provided for the purpose of conducting an operation within one revolution of the drive shaft. The clutch 22 is provided further with an eccentric 43, best illustrated in Fig. 6, through which movement is transmitted to the parts of the mechanism to be actuated and this eccentric is encompassed by an eccentric ring 44, which is provided with an extension arm 45 adapted to be connected to a driven part, such as the lever arm 46 disclosed in Fig. 4, which lever arm is connected at a central point by a pin 47 with the arm 45, fulcrumed at one end on adjustable supports 48, and having its opposite end connected by means of a pin 49 to an actuating lever or key bar 50, which is fulcrumed on bar 51 mounted in support 52 (Fig. 1).

The actuating levers 50 are respectively connected by pins 53 and links 54 with bell cranks 54a, which are fulcrumed at 55 and have their opposite ends connected at 56 with the push rods 57 slidably mounted in the guide plate 58 which is a part of the selector B. The ends of push rods 57 engage the selector, and, when moved by levers 50, through bellcranks 54a, effect a longitudinal movement of the selector (to the left in Fig. 1).

For the proper operation of the selector, one of its members (selector arm 80) must be moved longitudinally a different distance for each of the numbers punched in on the keyboard.

To provide for this varied or differential movement of the selector the bell crank levers 54a are designed of such different proportions, and are so arranged, that they convert a uniform movement in all the keybars to varied (differential) movements in the several push rods 57. The recited adjustable supports 48 are provided with screw sections 59 adjustably mounted in the bridge support 60, and having retaining lock nuts 61, the upper portion of the adjustable support 48 having a bifurcated section 62 provided with a pin 63 for rockably connecting the lever 46.

Figure 15:
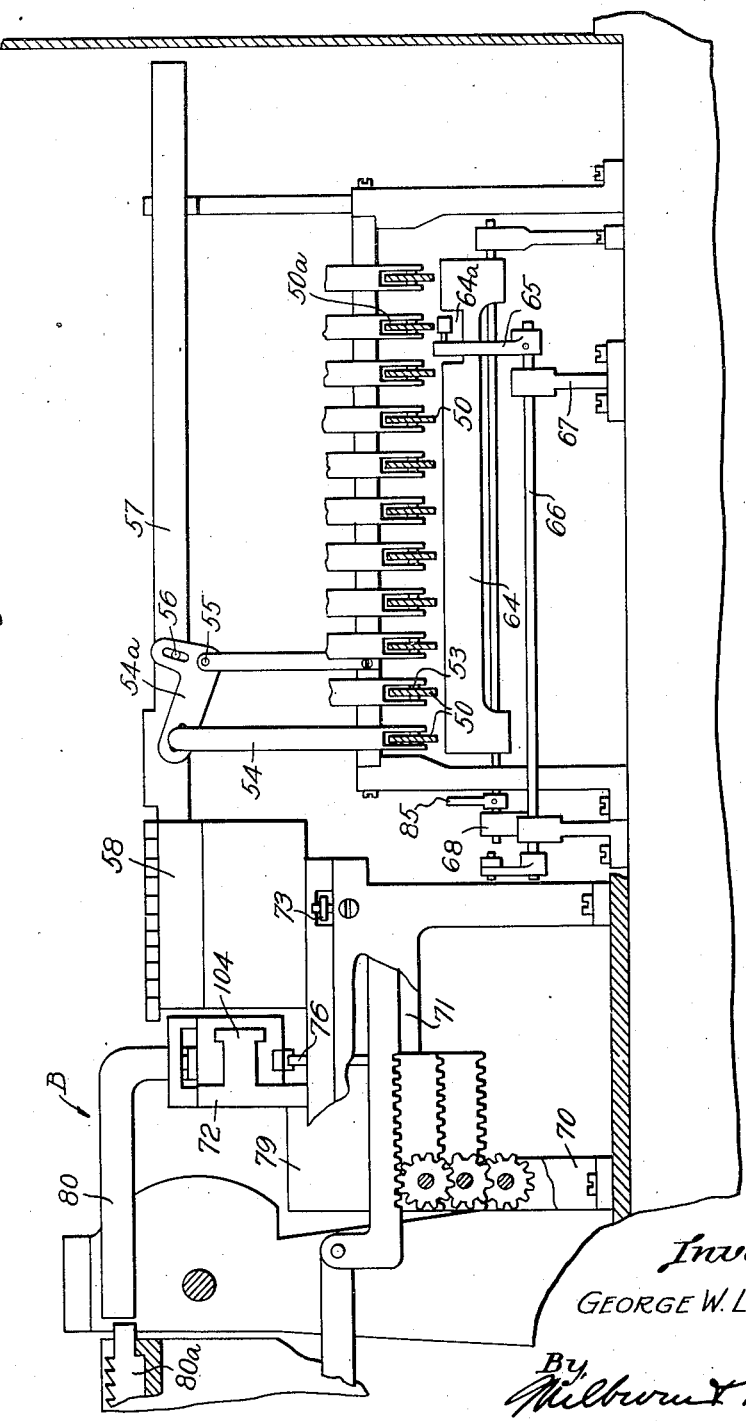
Fig. 15 is a transverse sectional view showing the keybars and one of their connections to the selector unit taken approximately on line 15—15 of Fig. 1.

A butterfly lever 64 is disposed immediately below and in the path of the travel of all of the actuating levers 50, but is provided with an opening 64a (Fig. 15) directly beneath the actuating lever 50a, which is actuated by the error key 20a.

The butterfly 64 is provided for receiving actuations from the actuating levers 50 as the keys connected to them are depressed during a setting-up operation.

Each actuation of a key (except the error key 20a) will therefore cause its connected actuating lever 50 to engage and rock the butterfly 64, which, by means of connections hereinafter described, actuates the progressive release lock C. By reason of the opening in the butterfly 64 directly beneath actuating lever 50a the error key 20a may be operated for clearing the machine without rocking the butterfly lever 64 and consequently without actuating the progressive release lock C. For transmitting the movement from the lever 50a to the error mechanism of the machine, I have provided a rocker arm 65 secured to an extending rock shaft 66, rockably mounted in the supports 67 and, by means of connections 68 (Fig. 1), operating the error rock shaft 69 which is part of the parcel post machine referred to.

Shaft 69 is connected by a linkage 240 (Fig. 21) with a secondary rock shaft 239 which has secured to it a lever arm 241. Arm 241 is rocked by cam 242 on shaft 114 at the completion of a printing operation.

The selector B comprises a supporting frame 70, having a cross member 71 and provided with roller bearings 73 on which the slidable selector carriage 72 travels in a longitudinal direction. Carriage 72 is provided with a guide rail or track 75 which slidingly supports the selector slide 74. Secured to the upper portion of the slide 74 is a selector arm 80, which contacts numeral printer rack bars 80a. Secured to the lower portion of the slide are escapement teeth 76, which are contacted by a spring-tensioned pawl 77, rockably mounted on cross member 71. The normal position of the pawl is shown in Fig. 4 in solid lines; its free position, under tension of its spring 77a, is shown in dotted lines.

The selector slide 74 is adapted to travel with a movement transverse to the travel of the carriage 72. In the operation of the machine the selector arm 80 is positioned successively opposite each of the series of parallel numeral wheel rack bars 80a in order to engage the end of a rack bar and move it longitudinally when the selector arm is moved longitudinally. The escapement teeth 76 and the spring-tensioned pawl 77 are so arranged as to permit the selector slide 74 to travel with a step by step transverse movement under tension of the spring 81, connected at one end to arm 81a of slide 74 and at its opposite end to a fixed arm 81b.

The escapement operation occurs upon the carriage 72 being moved longitudinally (to the left in Fig. 1, and at right angles to the movement of slide 74 on track 75 in Fig. 4), by which movement the tooth 76 then in contact with pawl 77 is moved out of contact therewith. Pawl 77 is thus allowed to move to its dotted line position under the tension spring 77a. At the start of the longitudinal movement of the carriage the tooth 76 is released from pawl 77 and during the remainder of such longitudinal movement rides on the face of the guide plate 79. The pawl 77, upon being released, is moved to its broken line position 77b by its tension spring 77a. Upon the return movement of the carriage by its tension springs 72a (Figs. 3 and 11) the tooth 76 which was formerly engaged by pawl 77 returns to its former position, but, having left the guide rail and being no longer engaged by the pawl 77 (see Fig. 11), is momentarily unrestrained. While in this condition slide 74, by the pull of its spring 81, is caused to move transversely (to the left in Fig. 4) until the next succeeding tooth 76 picks up and engages pawl 77 in its dotted line position. The continued movement of slide 74 by spring 81 carries pawl 77 with it until the pawl is brought into contact with stop 79a.

When thus brought to its solid line position, pawl 77, contacting the tooth next to the one it contacted before the longitudinal movement of the carriage, holds the slide in place for the next successive position of the selector arm 80 opposite the corresponding one of the rack bars.

This operation repeats itself automatically at each actuation of the keyboard until the predetermined number of keys have been manipulated, at which time the last rack bar of the group will have been actuated and the set-up completed.

When the machine is cleared and re-set, the selector slide 74, which is tensioned for escapement travel by means of spring 81, is returned to its original position (shown in Fig. 4) by a finger 82 secured on shaft 69, which is part of the error mechanism controlled by error key 20a.

In the return transverse movement of slide 74 (to the right in Fig. 4), the teeth 76 drag across the top of pawl 77 and force it down to a position to the right of the dotted line position in Fig. 4, so that it clears each tooth as it passes over it. In the return movement the last tooth is carried a sufficient distance past the pawl 77 to permit the pawl to return to its upright (dotted line position), whereupon the selector slide 74, under its spring tension, will move back slightly to permit one of its teeth to pick up the pawl 77, and the slide and pawl will together settle back to a position where the pawl rests against the stop 79a, thus positioning the selector arm 80 in front of the first of the group of rack bars which actuate the numeral wheels.

In order to provide direct positive connection between the numeral wheels of the printing mechanism (not shown) and the respective parts of the register actuating mechanism E, the numeral wheel racks, which are successively engaged by selector arm 80, are directly connected, by bars 313 and links 314 (Fig. 20) to the register rack bars 84, which slide in tracks 83 in cross member 71 and engage pinions 84a, secured to shafts 84b. These parts function to set up in the register set-up mechanism E the monetary values originated by operation of the keyboard A.

Figure 12:
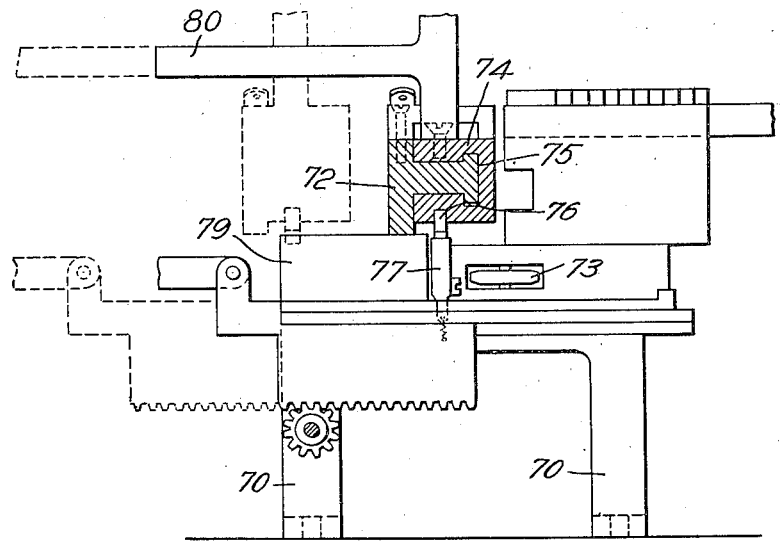
Fig. 12 is a sectional view taken on line 12—12 of Fig. 11, showing the selector carriage in two positions.
Figure 11:
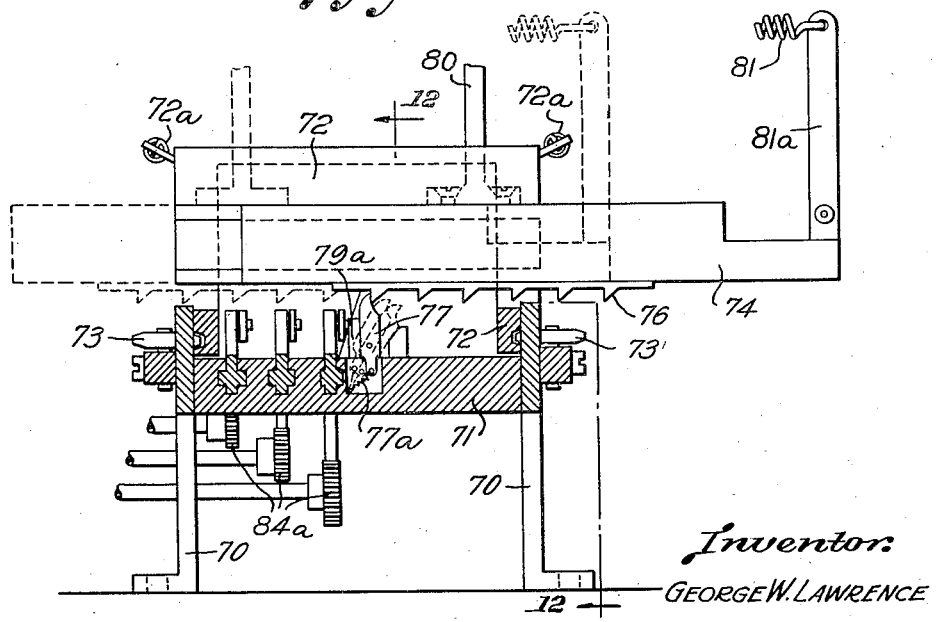
Fig. 11 is a sectional view of the selector unit, showing the slide in two positions.
Figure 13:
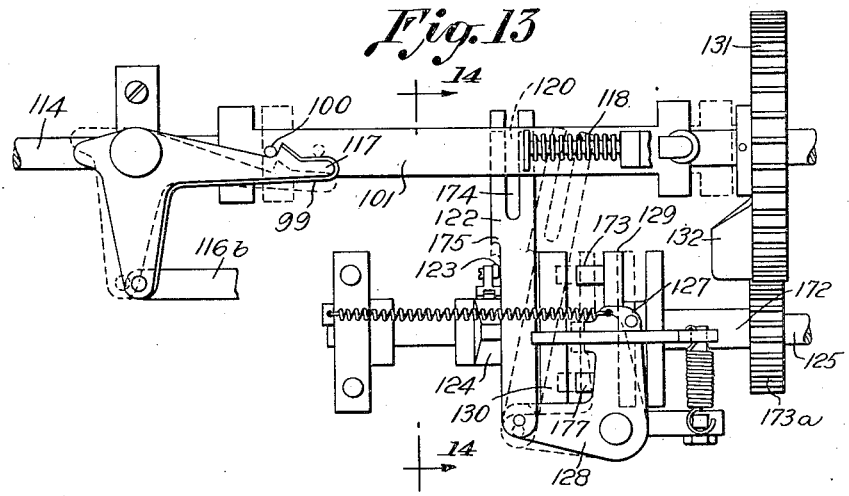
Fig. 13 is a semi-diagrammatic plan view of a portion of the clutch mechanism shown in normal clutch-disengaged position in solid lines, and in clutch-engaged position in broken lines.
Figure 14:
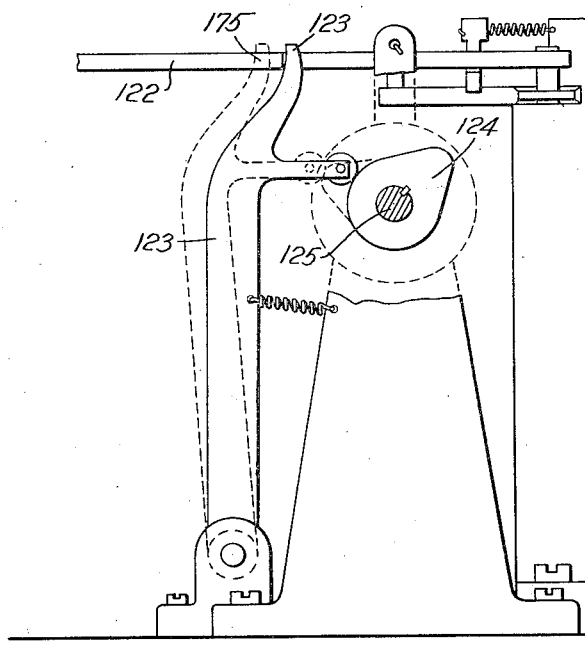
Fig. 14 is a diagrammatic side elevational view of the disengaging finger of the clutch and its connections, taken on line 14—14 of Fig. 13.

Each manipulation of the keyboard A, comprising the depression of a key during the setting up operation, moves the carriage 72 in its longitudinal path (to the left in Figs. 1 and 12) an amount equivalent to the number of the key depressed; upon the return of the carriage 72 to its starting position by springs 72a the selector slide 74 automatically moves transversely a distance of one tooth, and therefore moves the selector arm 80 into position to contact the next succeeding rack bar 80a; the repetition of this escapement movement in the setting up operation finally brings the selector slide 74 to the limit of its transverse movement, as shown by broken lines in Fig. 11. The selector slide 74 is tensioned in this movement by means of the spring 81; the carriage 72 is given its return movement from contacting the rack bars 80a by means of the tension springs 72a.

The progressive movements of the selector slide 74 are illustrated diagrammatically in Figs. 16, 17 and 18, wherein three positions of the selector arm 80 are illustrated. In Fig. 16 the selector slide 74 and the arm 80 are in their original starting positions. For an example of the longitudinal movement of the carriage 72 when a key is depressed in the keyboard I have illustrated in broken lines in this figure the positions assumed by the various moving parts of the selector when the key bearing the numeral 1 is depressed in the keyboard A.

A different position of the selector slide 74 and the arm 80 is illustrated in Fig. 17, where the arm is positioned in front of the fourth rack bar of the group 80a. To illustrate the longitudinal movement of the carriage 72 upon actuation of another key of the keyboard I have illustrated by broken lines the positions assumed by the moving parts of the selector when the key bearing the numeral 5 is depressed on the keyboard A.

The final positions assumed by the selector slide 74 and the selector arm 80 are illustrated in Fig. 18, wherein the selector arm 80 is positioned in front of the sixth rack bar of the group 80a. This figure also shows in broken lines the positions assumed by the moving parts of the selector when the key bearing the numeral 9 of the keyboard A has been depressed.

The progressive release lock unit C is composed of elements actuated by the butterfly 64 to rotate an actuating element which with a step by step progression movement releases a locking element normally engaged to retain the power clutch D in disengaged relation. From the butterfly 64 there are extending connections 85 to rock shaft 86 rockably mounted in bearings 87 and having connected thereto a lever arm 88 which actuates a connecting member 89 having connected to its outer end a rocking arm 90 fulcrumed on the release lock shaft 91 which is mounted in bearings 92, the said arm 90 having mounted on it a spring tensioned pawl 92a adapted to engage the teeth of the ratchet wheel 93 and thereby rotate this wheel in a counter-clockwise direction in Fig. 2. The ratchet wheel 93 is provided on one face with two pins 94 which, when rotated, engage a lock actuating member 95 slidably mounted in bearing 96 and which functions to slide the lock 97 in and out of engagement with a bell crank 98, said lock being slidably connected to trip 99 which normally engages pin 100 on clutch sleeve shaft 101 which is a part of the clutch D. The ratchet wheel 93 is provided with a non-reverse element comprising a spring-tensioned pawl 102, for engagement with the ratchet teeth to prevent reverse action of the ratchet wheel through drag of the pawl 92a.

The printing operation is instituted by means of control key 115 on the keyboard. This control key operates the power clutch D, which is also controlled by the progressive release lock C. The control key will not cause the actuation of the printing mechanism unless the power clutch is in released (unlocked) position, with the latch or trip 99 out of locking engagement with pin 100 on clutch sleeve shaft 101. The trip 99 is released only when the depression of six keys on the keyboard has rotated ratchet wheel 93 and its attached pins 94 to a position in which the lock-actuating member 95 is in engagement with one of the pins to be moved thereby. This relative position of the parts is established only when the ratchet wheel has been rotated to the position corresponding to the actuation of six keys. If a seventh key is depressed before the control key is operated, the ratchet wheel will be rotated correspondingly farther, carrying with it the pin which was in engagement with member 95, which pin slips past and out of the path of the member 95, which member, being unrestrained by pin 94, is restored to its normal locking position by its spring, the locking movement of member 95 replacing trip to lock pin 100. The same situation exists when the machine is cleared by operation of error key 20a. For further details of operation of this feature of the machine reference may be made to the patent to William J. Pearson, 1,958,925, issued May 15, 1934.

Figure 2:
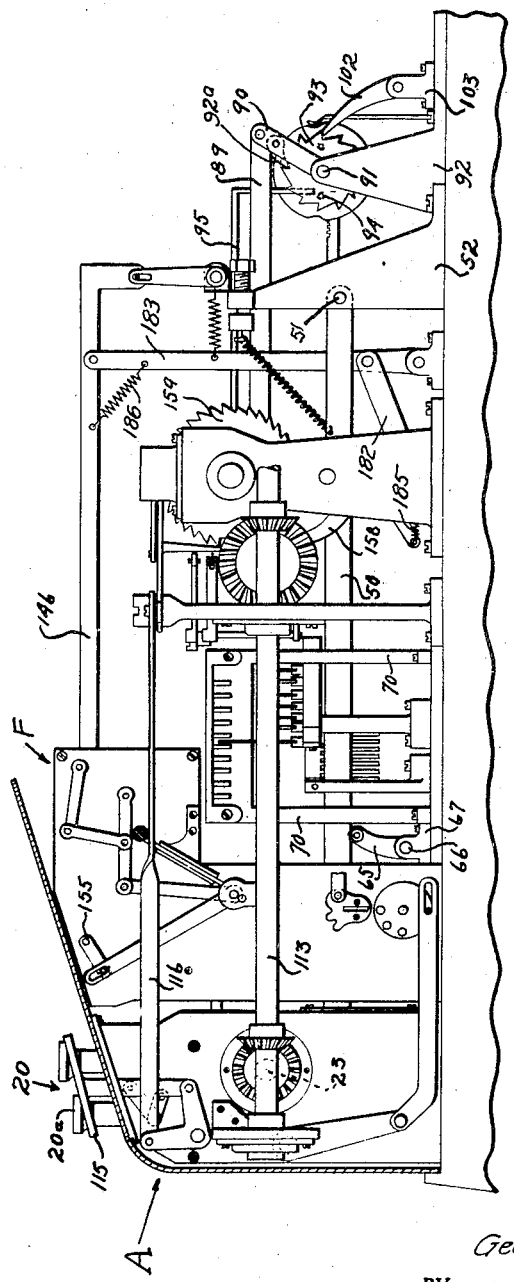
Fig. 2 is an elevation from the right of the keyboard and connecting parts operated therefrom taken on line 2—2 of Fig. 1.

For the purpose of returning the progressive release lock to original position regardless of the position to which it may have been actuated during the course of manipulation of the keyboard, I have provided certain connections which will pick up the rotating elements of the lock and return them to an original position, upon operation of the error key 20a, and also upon the completion of a printing operation of the parcel post machine, which has elements, not shown, for rocking the error rock shaft 69 with a movement identical to that occurring when the error key 20a is depressed. This return mechanism comprises a rock arm 104 secured to rock shaft 69 and connected to one end of a rack bar 105 which is supported adjoining its other end by roller 106 mounted in one of the bearings 92; the rack teeth 107 of rack bar 105 engage a pinion 108 mounted on a sleeve shaft, not shown, to which is secured a disc 109 provided with two ratchet pawls 110 adapted to engage internal teeth 111 in the rotating member 112, which is secured to the lock shaft 91; the rotating member 112 rotates the shaft 91 and also the ratchet wheel 93 which is secured to this shaft in a counter-clockwise direction, in Fig. 2. Upon the rotation of the ratchet wheel 93, the pins 94 are rotated out of contact with the lock member 95 to the position indicated by dotted lines in Fig. 2, allowing lock member 95 to return to normal position as shown in Fig. 2, by dotted lines.

The clutch D, which is the power clutch disposed between the power shaft 113 and the drive shaft 114 for operating the various operative elements of the machine, is of the type known as a pin clutch, the direct connection between the driving and driven elements being made by means of a pin.

In the operation of the clutch D the operator of the machine depresses the control key 115, which, through its connections 116, 116a, 116b, operates the trip 117, moving it out of engagement with the pin 100 carried by the slidable sleeve shaft 101.

Assuming that a proper set-up has been made in the machine and consequently that the trip 99 has been removed from pin 100, the release of the trip 117 will allow the clutch to engage. The slidable shaft 101 will move axially under actuation of spring 118; this movement of shaft 101, through the sliding connection between pin 119 on shaft 101 and arm 121, will move arm 121 into the path of the rocking finger 123. The finger 123 is actuated by means of the cam 124, secured to the clutch drive shaft 125, which, being gear-connected to the source of power through shaft 113, rotates continuously.

With the arm 121 thus positioned, the rotation of the cam 124 actuates the finger 123 to engage the notch 170 in arm 121, moving the latter longitudinally (upwardly in Fig. 1) to the limit of the movement permitted by the pin 119 in slot 171 and thereby rocking the connected bell crank 126 and the link 127, which is pivotally connected by pin 129a to the bell crank. This movement of link 127 (to the left in Fig. 1) causes the clutch to engage, the link being connected for this purpose to bell crank lever 128 which is in turn connected to the driven member 129 of the clutch, which is slidably mounted upon and keyed to the sleeve shaft 172. The clutch member 129 has a pin 173 which engages with the driving element 130 of the clutch, which is secured to the drive shaft 125 and rotates continuously.

When the clutch is thus engaged, movement is transmitted from the power shaft 113 to shaft 125, through clutch elements 130 and 129 to sleeve shaft 172, on which the element 129 is mounted; a gear 173a on the sleeve shaft meshes with and drives gear wheel 131, keyed to the main drive shaft 114 of the machine.

In order to disengage the clutch upon the completion of one complete revolution of the drive shaft 114, the gear wheel 131 is provided on one side with a cam 132, which is adapted to contact the slidable shaft 101 and move it axially to return it to its original position, thus restoring the pin 100 to the position at which it will be contacted and held in locked position by both the latch 99 and the latch 117. In its return axial movement slidable shaft 101 carries with it the arm 121, returning the arm to its original position out of the path of the cam-actuated finger 123, and simultaneously moves into the path of finger 123 the arm 122, by reason of the engagement of pin 120 on shaft 101 in the slot 174 of arm 122. So positioned, the notch 175 on arm 122 will be engaged by finger 123 under the actuation of cam 124 and arm 122 will thereby be moved longitudinally (upwardly in Fig. 1) to rock the bell crank lever 128 and the link 127 to which it is connected. This movement of link 127 (to the right in Fig. 1) pulls the driven clutch element 129 and its pin 173 away from the driving element 130, thus disengaging the clutch and leaving the various parts in the proper position for the next clutch engaging operation.

The form of clutch mechanism disclosed is for the purpose of providing a positive single rotation clutch mechanism wherein a clutch may be disengaged at a predetermined point in its cycle of operation.

The register set up unit E is interposed between the keyboard mechanism and the registers for the purpose of providing a means of clearing from the machine a set-up made through the keyboard, which may be incorrect, and which it may be desired to prevent being registered in the registers. This mechanism comprises two component parts, namely, the elements which are moved into a position whereby they represent the mechanical equivalent of numbers originating in the keyboard, and a second portion of the mechanism comprising actuating elements for conveying these mechanical equivalents into the registers.

As best shown in Fig. 3, the recited slide members 84 through their connections 133, actuate connecting gears 84a, and through them rack bars 176, each of which is connected by a pin 177 engaged in a slot 178 to one of a set of so called elevators, of which there is disclosed in Fig. 3 one elevator 134, namely, the elevator for conveying the mechanical equivalent of dollars. Through these connections, when one of the keys is depressed, the elevator 134 is moved differentially and selectively in a lateral direction to a position where one of the steps 135 corresponding to the number of the depressed key is brought into a position directly below the foot of the rack bar 136, and held there until the printing operation takes place in the machine, at which time, driven shaft 137 is actuated. This shaft is gear-related to the driven shaft 114, and has secured to it cams 138, of which one resides beneath each of the elevators. Upon actuation of the shaft 137, the cam 138 is rotated to contact the elevator 134, thereby raising it vertically, and the recited step 135 coming into contact with the foot of the rack bar 136 raises the rack bar with it to rotate the connected shaft 139 which in turn, through its connections, actuates the dollars wheel in the register F to register the amount set up.

A corresponding movement occurs through connecting gears 140 and rack 141 to indicator wheels 142, of which the one indicating the dollars amount would have been set up by this operation. The set up mechanism E comprises three sets of the elements just described, which complete the required mechanism to set up figures composed of dollars, tens of cents, and cents; these various parts are identical to each other both in structure and operation and are merely duplicates of the parts described and disclosed in Fig. 3. This device is fully disclosed in a copending application filed October 23, 1931, Serial No. 570,620.

My machine also includes an element whereby the parcel post machine may be controlled in its operations, as far as the monetary amount of stamps utilized is concerned, and will meet the requirements of the Post Office Department that a machine using or issuing metered mail stamps must be provided with a register which can be set for a pre-determined amount of postage by the post master, and which, upon the exhausting of that pre-set amount of postage will lock the machine against further operation, until the register has again been set for another amount.

Referring to Fig. 1, the unit F represents a control register such as I have just described, and which is operated by the set up mechanism E in conjunction with a registering register, not shown. This control register F has two separate functions; first, it is so constructed that it operates with a downward count movement, thus providing the operator of the machine with a visual reading of the remaining amount of postage in the register after each printing operation of the machine, whereby there has been subtracted from the last total remaining in the register the amount of the stamp printed after each respective printing operation; this register comprises the conventional register wheels and pinions except that the driven register wheels which include the first three, namely, the cents, tens of cents, and dollars wheels have internal ratchets to allow for the carrying over from one register wheel to another so that the numeral wheel may be actuated independently of the drive.

Second, the control register F, operates to lock the machine upon exhaustion of the pre-set amount of postage in the register F. The last numeral wheel which registers the highest amount in a set amount, namely, the thousands of dollars wheel 143, which, in Fig. 1 is located at the extreme left of the train of register wheels, has on one of its sides a cam face 144 which is designed to contact a trip lever 145 upon the exhaustion of a pre-set amount of postage within the meter. As best shown in Fig. 7, the trip 145 has thereon a pin adapted to be engaged by boss 144, and a foot 180 which engages beneath the drive bar 146 and retains the latter in a raised position. Upon the contact of the boss 144 with the pin 181 (Figs. 8 and 9), the trip 145 is moved outwardly, thereby removing the foot 180 from beneath the drive bar 146, and allowing the drive bar to be pulled down by spring 186 into a position in which the engaging member 147 will be in the path of the rocker cam 148 on shaft 152.

Thus, when the shaft 152 is rocked at the completion of the printing operation, the cam 148 will be brought to the position illustrated in Fig. 10, whereby the engaging member 147 will be engaged by the cam 148 and it (and the drive bar 146 to which it is fixed) will be moved to the position indicated by broken lines in Fig. 10 and retained in such position until the control register is re-set.

This longitudinal movement of the drive or control bar 146 will operate certain locking members, one of which is switch 150 in the motor circuit. Upon the opening of this switch the motor circuit is broken and the electrical operation of the machine is prevented. Switch 150 is of the conventional quick-throw type, and is operated through suitable connections with an extension 146a of bar 146.

An additional simultaneously actuated locking device locks the main drive shaft 114 of the machine. This device comprises a pawl 158 pivotally mounted to engage a toothed wheel 159 secured to the drive shaft 114. The pawl is actuated by the sliding link 182, to which it is attached by pin and slot connection 184. The link 182 is pivotally connected to rock arm 183, which in turn is connected to drive bar 146.

Still another locking element actuated by the movement of the drive bar 146 is the keyboard lock. The operation of the keys 20 of the keyboard and their keybars 50 is effected through the power-clutches 22 (Fig. 4). The clutch elements are normally out of engagement and are engaged upon release of rocking arm 27 from projecting member 26, the rock lever 37, secured to rock shaft 38, riding up on the cam face 36 of cam 31. Operation of the clutches, and consequently of the keys, is dependent upon freedom of rotation of the cam 31 of the clutch 22 with the tooth 25 of latch 21 in engagement with toothed wheel 24. These clutch elements are released when rocking arm 27 is rocked from its position shown in Fig. 5 to that shown in Fig. 4. Arm 27 is rocked to and held in this clutch-release position by pin 42 carried by bell crank lever 40, the upper arm of which is tilted upwardly when levers 37 and 40 are rocked by a clockwise rocking of shaft 38 in Fig. 4. This rocking of shaft 38 is effected, through rock arms 190 and 149 and link 191 by movement of drive bar 146 to its broken line position in Fig. 10, and results in effective locking of the keyboard mechanism by locking of the power-clutch elements of that mechanism.

Thus is will be seen that upon the exhaustion of the meter F, the trip 145 is operated to allow the drive bar 146 to drop down into the path of the cam 148; this cam 148 being driven through shaft 152 connected to the main drive shaft 114 to the printer, is actuated upon the completion of a printing operation to move drive bar 146 longitudinally and operate the connected locks and open the switch 150.

For the purpose of re-setting the meter F, there is provided a key lock 153 best shown in Fig. 1, which operates the re-set mechanism of register F, and also through connecting mechanism at 154 rotates shaft 155 which has connected to it lever 156 (Fig. 7) having a projecting end 157 adapted to lift the drive bar 146 out of engagement with the cam 148 and allow it to return to original position by spring action; this places the drive bar within the trip 145, and the re-setting operation of the register F displacing the cam face 144 from contact with the trip 145 allows the trip 145 to return to its original position, thus holding the drive bar 146 out of the path of the cam 148.

The action of returning the drive bar 146 to original position releases the pawl 158 from contact with the ratchet wheel 159, which is secured to the driven shaft 114, thus releasing this lock, and this same action also returns the switch 150 into the closed position shown in Fig. 7, thus making the machine normally operative. The return of the drive bar and connected parts to their original positions, which they normally occupy while the machine is in operative condition (as shown in Fig. 7) is aided by springs 185 and 187.

For the operation of the printing and registering mechanism by an operator in the simplest form and most convenient manner, I have provided a keyboard on the front portion of the parcel post machine which contains ten keys with numeral indications thereon, an error key for clearing the machine should a mistake have been made in the setting up of any of the combinations of figures, and a control key conveniently located adjacent the other keys for operation of the clutch which controls the printing operation of the machine.

The numbers having been properly set up by means of the keyboard, the progressive release lock C has automatically been operated to a point where it has removed the lock 97 from engagement and released the clutch D ready for operation. The operator now depresses the control key 115, engaging the clutch D, thereby rotating the shaft 114 which operates the printers and the actuating mechanism E for the registers. At the conclusion of the printing operation, the error rock shaft 69 is automatically operated through its various connections to clear the machine and also re-set the progressive release lock C into original locked position, where the entire machine is now ready for the next succeeding printing operation.

While the form of mechanism here shown and described, is admirably adapted to fulfill the objects primarily stated, it is to be understood that it is not intended to confine the invention to the one form of embodiment herein disclosed, for it is susceptible of embodiment in various forms, all coming within the scope of the claims which follow.

I claim:

1. In a device of the character described, a register, keyboard mechanism comprising a series of keys and key bars, means for actuating said register, operating connections between said key bars and said means, locking means for said keyboard mechanism, a lock-control means connected with said locking means, means for operating said lock-control means, latch means for holding said lock-control means with the parts thereof in lock-released position, and means connected with said register for engaging and releasing said latch means for operation of said lock-control means by its operating means.

2. In a device of the character described, a register, keyboard mechanism comprising a series of keys, means for actuating said register, operating connections between said keys and said means, locking means for said keyboard mechanism, a slidable control member connected with said locking means, lock-operating means for engaging and operating said control member, a latch for holding said control member out of the path of said lock-operating means, and a trip member on said register for engaging and releasing said latch.

3. In a device of the character described, a register, register actuating mechanism comprising a selector device, keyboard mechanism comprising a series of keys, means for actuating said selector device to set up values in said register corresponding to the keys depressed, power clutch connections between said keys and said means, locking means for said clutches, a slidable control member connected with said locking means, lock-operating means for engaging and operating said control member, a latch for holding said control member out of engagement with said lock-operating means, and a trip member on said register for engaging and releasing said latch.

GEORGE W. LAWRENCE.